United States Patent [19]

Mott et al.

[11] 4,356,439
[45] Oct. 26, 1982

[54] STEPPER MOTOR CONTROL

[75] Inventors: Richard C. Mott, Harwood Heights; Louis S. Smulkstys, Arlington Heights, both of Ill.

[73] Assignee: Honeywell Inc., Minneapolis, Minn.

[21] Appl. No.: 126,234

[22] Filed: Mar. 3, 1980

[51] Int. Cl.³ ............................................. G05B 19/40
[52] U.S. Cl. ................................... 318/685; 318/603
[58] Field of Search ...................... 318/685, 696, 603

[56] References Cited

U.S. PATENT DOCUMENTS

| | | | |
|---|---|---|---|
| 2,973,145 | 2/1961 | Daniels et al. | 235/132 |
| 3,009,635 | 11/1961 | Deighton | 235/61.6 |
| 3,070,298 | 12/1962 | Arnell et al. | 235/132 |
| 3,202,895 | 8/1965 | Arp et al. | 318/162 |
| 3,238,359 | 3/1966 | Einem et al. | 235/92 |
| 3,241,017 | 3/1966 | Madsen et al. | 318/138 |
| 3,466,515 | 9/1969 | Madsen et al. | |
| 3,622,761 | 11/1971 | Haase | 235/92 PE |
| 3,818,303 | 6/1974 | Rossel | 318/603 |
| 3,886,418 | 5/1975 | Austin et al. | 318/696 |
| 3,944,902 | 3/1976 | Lacorre et al. | 318/685 |
| 3,967,176 | 6/1976 | Wagener et al. | 318/603 |
| 4,009,373 | 2/1977 | Young | 235/92 FL |
| 4,023,084 | 5/1977 | Owa | 318/603 |
| 4,112,291 | 9/1978 | Fukuyama et al. | 318/603 |

*Primary Examiner*—B. Dobeck
*Attorney, Agent, or Firm*—Trevor B. Joike

[57] ABSTRACT

A control system for controlling a stepping motor having a predetermined number of steps between its start position and its fully extended position having a stepper motor, an initiate circuit for supplying pulses to the stepping motor to drive the stepping motor to its initial or start position, and a positioning control for stepping the stepping motor from its start position to a desired position.

28 Claims, 3 Drawing Figures

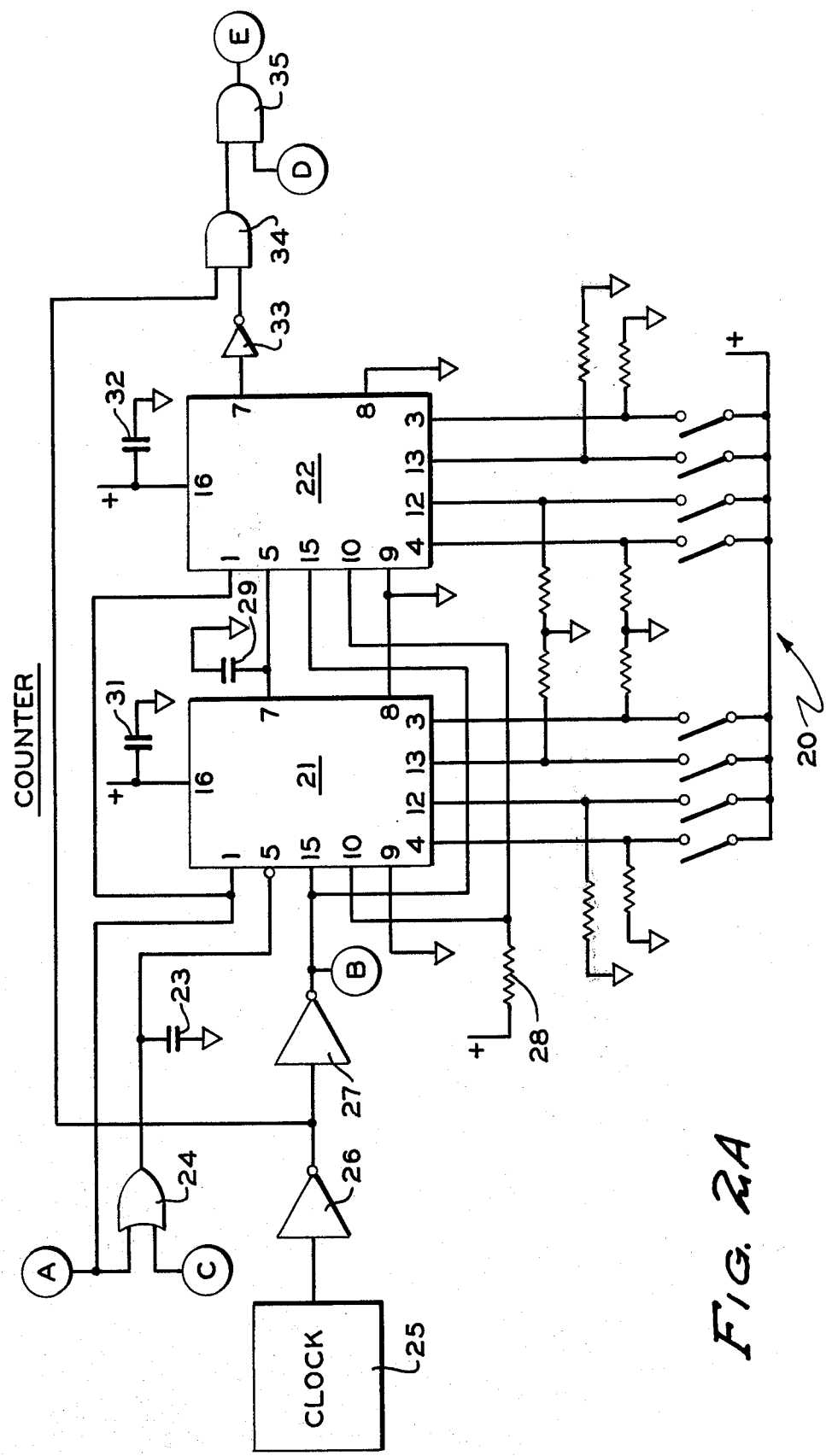

STEPPER MOTOR CONTROL

BACKGROUND OF THE INVENTION

This invention is related to the control of stepping motors and, although it has a broad application to any applications for stepping motors, it is particularly directed to the use of stepping motors in the adjustment of control points for remotely located control systems.

There is a definite need in building automation control systems for inexpensive and accurate interfaces between digital controllers and local controllers and/or actuators. This interface is commonly referred to as the control point adjuster or CPA; that is, the controller can control local controllers or actuators by regulating the control point adjuster to establish the set point against which actual conditions are compared and controlled. The local controller is quite often a pneumatic pressure controller and/or actuator.

For example, a typical building automation control system includes a central processing but quite often incorporating a computer and located in a central office of the building or buildings under control. The central processing unit is connected over a coaxial cable to remotely located data gathering panels which may themselves include microprocessors or other forms of computers. Connected to each data gathering panel is a plurality of remote points to be controlled by or to supply input information to the data gathering panel and through the data gathering panel to the central processing unit. These remote points may include the fans, valves, dampers, thermostats, static pressure sensors and humidity sensors of an air conditioning control system. Utilizing these sensors and leads, the data gathering panel is fully capable of maintaining established space conditions within the building. It will periodically report back to the central processing unit the actual conditions existing at the remote location. The central processing unit can modify the actual conditions at the remote location by transmitting to the data gathering panel new control points to be established by the data gathering panel.

Since transmission between the local controller represented by the data gathering panel and the central processing unit is over a coaxial cable, thus to reduce the number of wires connecting the central processing unit to its load and sensing points in order to in turn reduce the installation cost of the system, it is much simpler for the central processing unit to control the local controller in an open loop configuration rather than devising a feedback scheme so that the central processing unit will be informed that the control point adjustment mechanism has been established at the point dictated by the central processing unit. Thus, in an open loop configuration, the central processing unit will send a new control point to the data gathering panel and will not receive any feedback that the adjustment mechanism has been adjusted to the new control point dictated by the central processing unit.

Since in an open loop configuration the central processing unit receives no guarantee that the remote control point adjuster has achieved the desired position, there exists a problem in insuring that the correlation between the control point dictated by the central processing unit and the actual control point of the local controller are substantially the same. For example, if the central processing unit had previously instructed the control point adjuster to adjust the control point to point A but the actual position attained by the control point adjuster is point B, any subsequent instruction to the control point adjuster to move to a new position will be subject to the error B−A.

SUMMARY OF THE INVENTION

The present invention solves this problem by providing a stepping motor for positioning the control point adjuster and by driving the stepping motor to a start position each time the control point is to be changed. Thus, when the local controller is commanded to assume a new control point, a digital word is transmitted from the central processing unit to the data gathering panel indicative of the new position. When the digital word arrives at the data gathering panel, the stepping motor is driven back to its start position and then driven to the new command point as indicated by the digital word.

Thus, the control system for the stepping motor of the present invention includes an initiate or start circuit connected to the stepping motor for supplying pulses to the stepping motor to drive the stepping motor to its start position and a position control circuit connected to the stepping motor and responsive to the stepping motor reaching its start position for driving the stepping motor to a desired position.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
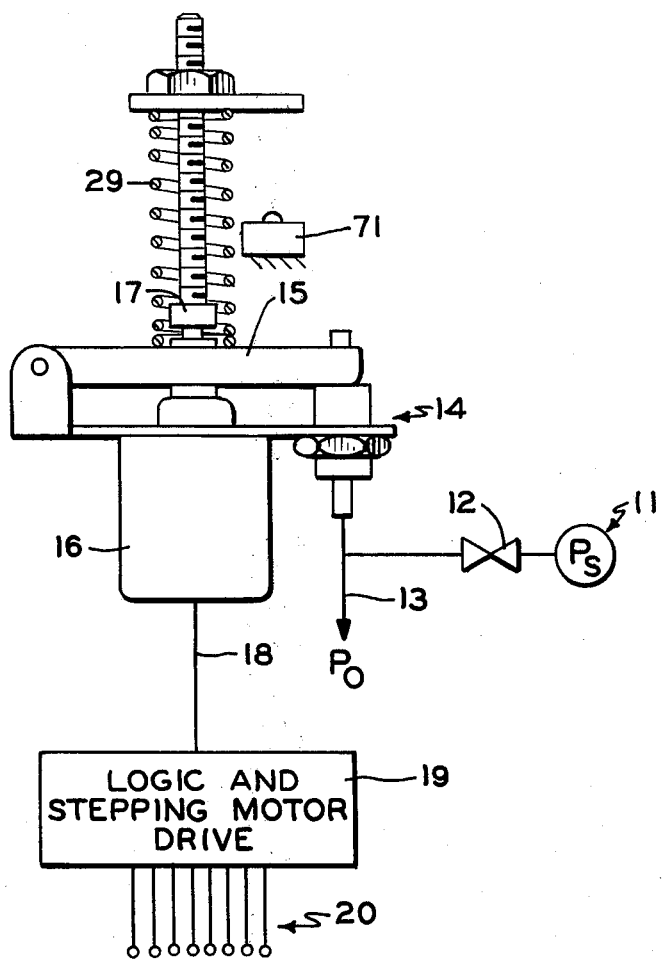
FIG. 1 is a diagram showing the stepping motor when used in conjunction with a control point adjustment mechanism; and, FIGS. 2A and 2B show a schematic diagram of the logic and stepping motor drive circuit shown in FIG. 1.

Although the stepping motor control system according to the present invention has a wider application, for the sake of clarity it is disclosed herein in conjunction with the control point adjuster of a local controller such as that used in building air conditioning systems. Such building air conditioning systems are typically pneumatic in view of the relatively lower cost of installing pneumatic systems as opposed to electrical systems. The pneumatic system of FIG. 1 includes source of supply pressure 11 connected through restriction 12 to output line 13. Output line 13 is also connected to nozzle 14 which operates in conjunction with flapper 15 to establish a control point pressure in line 13 any excess pressure being vented to atmosphere by nozzle 14. The force on flapper 15 with respect to nozzle 14 is controlled by stepping motor 16. Stepping motor 16 has an output shaft 17 which is connected to flapper 15 through spring 29. Stepping motor 16 is connected by line 18 to logic and stepping motor drive circuit 19 which has a plurality of inputs 20 for receiving a digital word indicating the position to be achieved by stepping motor 16 for establishing a new control pressure in line 13 by adjusting the force on flapper 15. Limit switch 71 senses the start or initial position of motor 16.

Figure 2B:
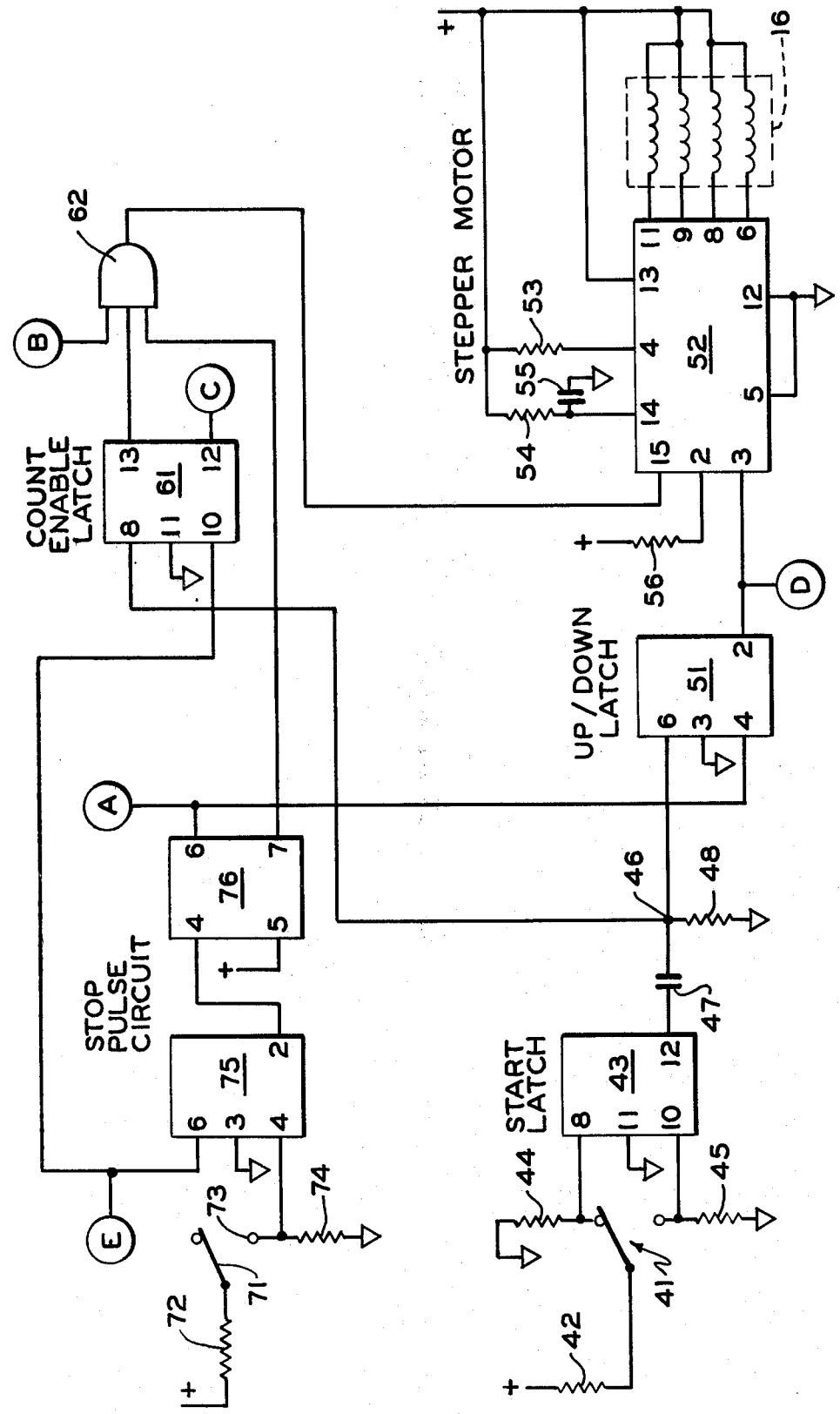

For simplicity, inputs 20 are shown in FIG. 2A as two banks of four switches each. It is to be noted, however, that these inputs 20 can be connected to a transceiver which receives serial information from a remote location and converts the serial information into parallel form. The control system shown in FIGS. 2A and 2B includes counter 21-22, which may each be comprised of 14516 counters having their pins 4, 12, 13 and 3 each connected to an individual switch and to ground through a corresponding resistor. The other side of each switch is connected to a positive source. Pins 1 of counter 21-22 are connected to terminal A, pin 5 of counter 21 is connected to ground through capacitor 23 and is also connected to the output of OR gate 24 having a first input connected to terminal A and a second input connected to terminal C. A source of pulses includes clock 25 connected through first inverter 26 and second inverter 27 to pins 15 of counter 21-22. Pins 10 of counter 21-22 are connected to a positive source through resistor 28. Pins 8 and 9 of counter 21-22 are connected to ground. Pin 7 of counter 21 is connected to ground through capacitor 29 and is also connected to pin 5 of counter 22. Pins 16 of counter 21-22 are connected to a positive source and also to ground through respective capacitors 31 and 32. The output of counter 21-22 is taken at pin 7 of counter 22 and is connected through inverter 33 to one input of AND gate 34 the other input of which is connected to the junction of inverters 26 and 27 for receiving an inverted clock signal. The output of AND gate 34 is connected to one input of AND gate 35 the other input of which is connected to terminal D and the output of AND gate 35 is connected at terminal E. Terminals A, B, C, D and E show how FIGS. 2A and 2B are interconnected.

A start latch circuit is shown in FIG. 2B for initiating operation of the control system for controlling the stepping motor according to the instant invention. In actual case, the start latch might be replaced by an output from the transceiver which receives the digital word representing the new position for stepping motor 16. For example, this output may be in the form of a receive-complete signal which indicates that the digital word is present for latching into counter 21-22. However, for purposes of explanation, the start latch circuit shown in FIG. 2B is comprised of switch 41 which has a movable contact connected to a positive source through resistor 42, a first stationary contact connected both to pin 8 of latch 43 and to ground through resistor 44, and a second stationary contact connected to pin 10 of latch 43 and to ground through resistor 45. Pin 11 of latch 43, which may be in the form of a 4013, is connected to ground and pin 12, the output pin, is connected to junction 46 through capacitor 47. Capacitor 47 and resistor 48 which is connected between junction 46 and ground forms a differentiating circuit which converts the step change at pin 12 upon switching of latch 43 to a pulse.

Junction 46 is connected to pin 6 of up/down latch 51 which may be in the form of a 4013 and has its pin 3 connected to ground and its output pin 2 connected to pin 3 of stepping motor control circuit 52. The output of up/down latch 51 is also connected to terminal D shown in FIG. 2A. Circuit 52 may be in the form of an SAA1027 and controls the four windings of stepping motor 16 in the proper sequence for stroking the output shaft 17 out and in. Thus, pins 5 and 12 are tied to ground, pins 6, 8, 9 and 11 are connected respectively through the four windings of stepping motor 16 to a positive source, pin 13 is tied directly to the positive source, pin 4 is tied to the positive source through resistor 53 and pin 14 is tied to the positive source through resistor 54 and is also tied to ground through capacitor 55, pin 2 is tied to a positive source through resistor 56, and pin 15 receives driving pulses for stepping motor 16 from the count enable latch circuit comprising latch 61 and AND gate 62. Latch 61 is initially triggered by the pulse at junction 46 to enable AND gate 62 to pass clock pulses from terminal B as shown in FIG. 2A which terminal is connected from the output of inverter 27. Latch 61 may also take the form of a 4013 latch having pin 8 tied to junction 46, pin 11 tied to ground, pin 10 tied to terminal E (the output from the counter of FIG. 2A), pin 13 tied to one input of the AND gate 62 and a second output at pin 12 connected to terminal C which is connected as shown in FIG. 2A.

Finally, a stop pulse circuit is shown for providing a stop pulse when the motor has been driven back to its start position. The stop pulse circuit takes the form of the limit switch 71 for sensing the start position of shaft 17 of motor 16 through flapper 15. Switch 71 has a movable contact connected to a positive source through resistor 72 and a stationary contact 73 connected to ground through resistor 74 and also connected to pin 4 of a bistable 4013 latch. Pin 3 of bistable circuit 75 is connected to ground and pin 6 is connected to terminal E which forms the output of the counter circuit shown in FIG. 2A. Output pin 2 of bistable circuit 75 is connected to input terminal 4 of monostable circuit 76 which may be in the form of a 14538 having pin 5 connected to a positive source and pin 6, providing the output pulse, connected to pin 4 of up/down latch 51, to pins 1 of counter 21-22, and to one input of OR gate 24. Output pin 7 of monostable circuit 76 provides the output pulse for the third input of AND gate 62.

In operation, switches 20 are operated in a manner to input the complement of the new count to the counter 21-22 where the new count represents the new desired position for stepping motor 16. Since counter 21-22 as shown in FIG. 2A is an up counter providing an output on the count of 128, the complement is arrived at by subtracting the new count from the count of 128. Thus, counter 21-22 will count up from the complement to the count of 128 the difference of which is the new count representing the new desired position for stepping motor 16. As discussed above, switches 20 may be replaced by the outputs of a transceiver which presents to counter 21-22 the complement of the new position for stepping motor 16. Switch 41 is then operated against its lower terminal connected to pin 10 of start latch 43. Also as noted above, switch 41 with latch 43 and differentiator 47-48 can be replaced by a further output from the transceiver which is connected to counter 21-22. A momentary output pulse at junction 46 is then provided by the transceiver.

Upon release, the movable contact of switch 41 returns to its upper contact which resets latch 43. The pulse at junction 46 switches both latches 51 and 61. When up/down latch 51 switches, pin 2 is pulled high which conditions controller 52 for operating stepping motor 16 in a reverse direction toward its start position. When latch 61 is switched, pin 13 is pulled high and, because output pin 7 of monostable 76 is also high, AND gate 62 is enabled to pass clock pulses from terminal B to pin 15 of controller 52 for driving stepping motor 16 in the reverse direction toward its start position. Also, pin 12 of latch 61 is pulled low which will condition counter 21-22 to count.

When stepping motor 16 has returned shaft 17 to its start position, switch 71 will be operated against stationary contact 73 which will switch bistable circuit 75 for supplying an input to monostable flip-flop 76 which switches to supply a stop pulse out at its pin 6. This stop pulse resets up/down latch 51 to condition circuit 52 at pin 3 for operating stepping motor 16 in the opposite direction, i.e. the outstroke direction. The stop pulse is also supplied to pins 1 of counter 21-22 for latching in the information available at switches 20 and is also connected through OR gate 24 for preventing counter 21-22 from counting the clock pulses at pin 15 until the cessation of the stop pulse. Since the stop pulse prevents counter 21-22 from counting clock pulses, it is also used in its inverted form at pin 7 of circuit 76 to supply a further input to AND gate 62 to prevent this gate from passing clock pulses to stepping motor 16; thus, counter 21-22 and stepping motor 16 are synchronized.

When the stop pulse terminates, counter 21-22 will count the pulses supplied by clock 25 and, because latch 61 is still set, AND gate 62 will also pass these clock pulses through to stepping motor control 52 to begin stepping shaft 17 in the outstroke direction. When shaft 17 has been stepped out the number of pulses represented by the count established by switches 20, pin 7 of counter 22 will provide an output which is inverted and supplied to one input of AND gate 34 conditioning that AND gate to pass the next clock pulse. At the same time, the up/down latch has been reset by the stop pulse and thus terminal D is also high which conditions AND gate 35 to pass that clock pulse. Thus, the next clock pulse is supplied to terminal E which resets bistable flip-flop 75 and latch 61. When latch 61 resets, AND gate 62 is no longer enabled to pass clock pulses at terminal B and thus the operation of stepping motor 16 is terminated. Also, terminal C goes high which is connected through OR gate 24 for terminating any further counting of counter 21-22.

It is to be noted that when the count enable latch 61 is first switched by start latch 43, terminal C goes high which is connected through OR gate 24 to pin 5 of counter 21 which allows counter 21 and counter 22 to count. However, since the new count at switches 20 has not been latched into counter 21-22 by stop pulse at A, and since the up/down latch has been switched so that terminal D is low and thus AND gate 35 is not enabled, the counting by counter 21-22 has no effect on the system. It is only when stop pulse A has been generated to allow terminal D to again go high and to latch in the information available at switches 20 and to counter 21-22, that the counter 21-22, and AND gates 34 and 35 are conditioned to pass the signal at terminal E to stop operation of stepping motor 16. It is also to be noted that although limit switch 71 is shown as the preferred embodiment of the present invention, it is possible to replace the stop pulse circuit by a counter which, upon the operation of start latch 43, supplies a predetermined number of counts to controller 52 equal to the total number of steps necessary to drive stepping motor 16 from its full stroke position to its start position. Thus, no matter where output shaft 17 happens to be between its extreme positions, it will always be stepped back to its start position.

The embodiments of the invention in which an exclusive property or right is claimed are defined as follows:

1. A control system for controlling a motor to a motor means having a motor;
a source of pulses;
initiate means connected to said motor means for connecting said source of pulses to said motor means to drive said motor in a reverse direction to a start position; and,
positioning means including a counter having an input for receiving an input count representing said desired position, said positioning means connected to said motor means and to said source of pulses and responsive to said motor reaching said start position for connecting said source of pulses to said counter and to said motor means to drive said motor in a forward direction, said counter counting pulses from said source so that when said number of counted pulses beginning at said start position substantially equals said input count, said positioning means will stop said motor.

2. The system of claim 1 wherein said motor is a stepping motor having a predetermined number of steps between its start and its full stroke positions.

3. The system of claim 2 wherein said positioning means comprises a counter having said first input for receiving said input signal representing said desired position, a second input connected to said source of pulses, a third input for enabling said counter to count said pulses from said source of pulses until said counter reaches a state determined by said input signal, and an output means for controlling the supply of pulses to said stepping motor.

4. The system of claim 3 wherein said positioning means comprises stop pulse means responsive to said stepping motor reaching said start position for reversing the drive of said stepping motor to step said stepper motor to its desired position, said stop pulse means being connected to said third input of said counter.

5. The system of claim 4 wherein said motor means comprises count enable means having a first input connected to said source of pulses, a second input connected to said initiate means for supplying said pulses to said stepping motor, and a third input connected to said output means of said positioning means for disconnecting said pulses from said stepping motor when said counter reaches said state determined by said input signal.

6. The system of claim 5 wherein said motor means comprises an up/down circuit having a first input connected to said initiate means, a second input connected to said stop pulse means and an output for controlling the direction of said stepping motor.

7. The system of claim 6 wherein said count enable means comprises a latch having said second input connected to said initiate means, said third input connected to said output means and an output, said count enable means further comprising a logic gate having said first input connected to said source of pulses and having a further input connected to said output of said count enable latch.

8. The system of claim 7 wherein said stop pulse means comprises a limit switch for sensing said start position of said stepping motor.

9. The system of claim 8 wherein said output means comprises a first logic gate having a first input connected to said source of pulses and a second input connected to an output of said counter, and a second gate having an input connected to an output of said first logic gate and a second input connected to said output of said up/down circuit.

10. The system of claim 1 wherein said motor means comprises an up/down circuit having a first input connected to said initiate means, a second input connected to said positioning means and an output for controlling the direction of said motor.

11. The system of claim 10 wherein said positioning means comprises stop pulse means responsive to said motor reaching said start position for reversing the drive of said motor to step said motor to its desired position, said stop pulse means being connected to said second input of said up/down circuit.

12. The system of claim 11 wherein said stop pulse means comprises a limit switch for sensing said start position of said motor.

13. The system of claim 12 wherein said positioning means comprises a counter having a first input for receiving an input signal representing said desired position, a second input connected to receive pulses from a source of pulses, a third input connected to said stop pulse means for enabling said counter to count said pulses from said source of pulses until said counter reaches a state determined by said input signal, and an output means for controlling the supply of pulses to said motor.

14. The system of claim 13 wherein said motor means comprises count enable means having a first input connected to said source of pulses, a second input connected to said initiate means for supplying said pulses to said motor, and a third input connected to said output means of said positioning means for disconnecting said pulses from said motor when said counter reaches said state determined by said input signal.

15. The system of claim 14 wherein said count enable means comprises a latch having said second input connected to said initiate means, said third input connected to said output means of said positioning means, and an output, said count enable means further comprising a logic gate having said first input connected to said source of pulses and having a further input connected to said output of said count enable latch.

16. The system of claim 1 wherein said positioning means comprises stop pulse means responsive to said motor reaching said start position for controlling said motor means to drive said motor to its desired position.

17. The system of claim 16 wherein said stop pulse means comprises a limit switch for sensing said start position of said motor.

18. A control system for a stepping motor having a predetermined number of steps between its start position and its fully extended position and for controlling said stepping motor to a desired position comprising:
 a source of pulses;
 stepping motor means connected to said source of pulses and having a stepping motor;
 counter means having a first input for receiving an input count representing said desired position, a second input connected to said source of pulses, a third input for enabling counting of said pulses, and an output for providing an output signal when said stepping motor has attained said desired position;
 initiate means connected to said stepping motor means for driving said stepping motor to said start position; and,
 stop pulse means connected to said third input of said counter means for enabling said counter means to begin counting said pulses when said stepping motor reaches said start position, said counter continuously accumulating counts from said source of pulses beginning with said start position, and to control said stepping motor means to reverse the direction of driving of said stepping motor once it has reached said start position,
 said stepping motor means being connected to said output of said counter means for de-energizing said stepping motor when said accumulated counts substantially equal said input count.

19. The system of claim 18 wherein said stop pulse means comprises a limit switch for sensing the start position of said stepping motor.

20. The system of claim 19 wherein said stepping motor means comprises an up/down circuit having a first input connected to said initiate means for conditioning said stepping motor to step backwards to its start position and a second input connected to said stop pulse means for conditioning said stepping motor for stepping in its forward direction to said desired position.

21. The system of claim 20 wherein said stepping motor means comprises count enable means having a first input connected to said source of pulses, a second input connected to said initiate means, and a third input connected to said output of said counter means, said count enable means supplying said pulses to said stepping motor in response to said initiate means and disconnecting said pulses from said stepping motor in response to said output signal from said counter means.

22. The system of claim 21 wherein said count enable means comprises a latch having an output, said second input for initiating the supply of pulses to said stepping motor means, and said third input for terminating said supply of pulses to said stepping motor means, said count enable means further comprising a logic gate having said first input connected to said source of pulses and a further input connected to said output of said latch.

23. The system of claim 22 wherein said stop pulse means comprises a monostable multivibrator having input means connected to said limit switch and an output connected to said counter means and to said stepping motor means.

24. The system of claim 18 wherein said stepping motor means comprises an up/down circuit having a first input connected to said initiate means for conditioning said stepping motor to step backwards to its start position and a second input connected to said stop pulse means for conditioning said stepping motor for stepping in its forward direction to said desired position.

25. The system of claim 24 wherein said stepping motor means comprises count enable means having a first input connected to said source of pulses, a second input connected to said initiate means, and a third input connected to said output of said counter means, said count enable means supplying said pulses to said stepping motor in response to said initiate means and for disconnecting said pulses from said stepping motor in response to said output signal from said counter means.

26. The system of claim 25 wherein said count enable means comprises a latch having an output, said second input for initiating the supply of pulses to said stepping motor means, and said third input for terminating said supply of pulses to said stepping motor means, said count enable means further comprising a logic gate having said first input connected to said source of pulses and a further input connected to said output of said latch.

27. The system of claim 18 wherein said stepping motor means comprises count enable means having a first input connected to said source of pulses, a second input connected to said initiate means, and a third output connected to said output of said counter means, said count enable means supplying said pulses to said stepping motor in response to said initiate means for disconnecting said pulses from said stepping motor in response to said output signal from said counter means.

28. The system of claim 27 wherein said count enable means comprises a latch having an output, said second input for initiating the supply of pulses to said stepping motor means, and said third input for terminating said supply of pulses to said stepping motor means, said count enable means further comprising a logic gate having said first input connected to said source of pulses and a further input connected to said output of said latch.

* * * * *

UNITED STATES PATENT OFFICE
CERTIFICATE OF CORRECTION

PATENT NO. : 4,356,439
DATED : October 26, 1982
INVENTOR(S) : Richard C. Mott et al It is certified that error appears in the above-identified patent and that said Letters Patent are hereby corrected as shown below:

Claim 1, line 1, after "to a" insert --desired position comprising:--.

Claim 4, line 4, changer "stepper" to --stepping--.

Signed and Sealed this

Eighteenth Day of January 1983

[SEAL]

Attest:

GERALD J. MOSSINGHOFF

Attesting Officer    Commissioner of Patents and Trademarks